May 4, 1965   H. T. WOODWARD ETAL   3,181,600
LIQUID TO LIQUID HEAT EXCHANGE
Filed Jan. 24, 1961   6 Sheets-Sheet 4

INVENTORS
HENRY TEYNHAM WOODWARD
WILLIAM A. SHRODE
BY Hans F. Hoffmeister
ATTORNEY

United States Patent Office 3,181,600
Patented May 4, 1965

3,181,600
LIQUID TO LIQUID HEAT EXCHANGE
Henry Teynham Woodward, Los Altos, and William A.
Shrode, San Jose, Calif., assignors to FMC Corporation,
a corporation of Delaware
Filed Jan. 24, 1961, Ser. No. 84,652
19 Claims. (Cl. 165—1)

This invention relates to heat exchange and more specifically to a method and apparatus for exchanging heat between immiscible liquids of different densities. Although the application of the heat exchange units of this invention is not limited to any particular service, the heat exchange units of this invention will be described in conjunction with a system for converting sea water to fresh water. Sea water conversion systems employing conventional type heat exchangers present a number of severe problems, but these problems are minimized in a system employing the heat exchangers of this invention. Conversion of sea water into fresh water for home and industrial use by distillation involves the processing of a large volume of water, and heat exchangers are required to recover from the fresh water condensate the heat of evaporation supplied to the sea water. One of the severe problems under these conditions is that when conventional tube, fin and tube, or packed type heat exchangers are employed, heavy deposits of scale are formed at the heat exchange surfaces. If the scale is not periodically removed, the efficiency of heat transfer is lowered, resulting in a substantial increase in the cost of operation of the device. The removal of scale and other deposits from metallic heat exchange surfaces is a difficult, if not an almost impossible operation, and such removal also adds to the cost of the process.

In accordance with the present invention, heat is imparted to the sea water, for making possible subsequent evaporation and condensation into fresh water, by a heat exchange system that provides direct contact between the water and a liquid that is immiscible with water, such as a highly refined saturated hydrocarbon or petroleum product to be hereinafter referred to as an oil. For example, in the sea water heating heat exchange unit, cold sea water is admitted at the top of the unit and flows downwardly through the unit. Hot oil is admitted near the bottom of the unit. Means are provided to break the oil up into droplets that pack together without coalescing as the droplets rise through the water column. This results in a transfer of heat from the oil to the sea water so that the sea water emerges from the bottom of the heat exchange unit hot, and the oil is withdrawn from the top of the unit at a temperature that is just a little higher than that of the cold incoming sea water. This system has the advantage that the heat exchange surfaces are constantly renewed, as the water and oil droplets flow past one another, and there is not problem of removing scale from the active heat exchange surfaces.

An object of the present invention is the provision of a liquid to liquid heat exchanger suitable for service under high volume flow conditions and operable without scaling even though one of the liquids may be a liquid such as sea water, that normally produces heavy scaling in heat exchangers.

Another object of the invention is to provide a liquid to liquid heat exchange system that will operate at a small temperature difference between the liquids. This results in a unit of high efficiency with a corresponding reduction in the cost of supplying heat to the system.

Another object is to provide a heat exchange system in which the heat exchange surfaces have a large area, and are continuously self-renewing, thereby eliminating the problem of removing scale from the heat exchange surfaces.

An advantage of the system of the invention employing an oil as one of the heat exchange liquids is that the make up heat that is required in all heat exchange systems because of inevitable losses, can be supplied directly to the oil by a conventional oil heater, such as a tubular heat exchanger. Under these conditions the problem of scaling in the heat exchanger provided for supplying make up heat to the system are greatly reduced because there is little tendency for oil to scale the heat exchange surfaces of the heater.

Many oils suitable for use in the heat exchangers of this invention have the property that their specific heat increases as their temperature increases. It has been found that this property tends to render the temperature difference that occurs between the oil and the water non-uniform along the length of the liquid column. In a saline water conversion system, dual heat exchange units will be provided, one unit serving to heat the cold sea water with hot oil as previously described, the other unit serving to heat the cooled oil with hot fresh water. In the oil heating unit this characteristic of the oil reduces the heat transfer efficiency of the unit, and hence reduces the amount of heat that is transferred to the oil. In accordance with this invention, where dual heat exchange units are employed, advantage is taken of the dual nature of the system to partially compensate for the above mentioned variation in specific heat of the oil.

Accordingly, another object of the invention is to transfer a maximum quantity of heat to the oil. This is done by compensating for changes that occur in the specific heat of the oil, as the oil is heated up in the oil heating unit, thereby maintaining more uniform the temperature differences between the oil and the water in the oil heating unit. By maintaining these differences as uniform and as small as possible, maximum efficiency of the oil heating unit is provided. This compensation is accomplished in the aforementioned dual heat exchange system wherein one heat exchange unit transfers heat from previously heated oil to the incoming cold sea water, and the other heat transfer unit transfers heat from the hot fresh water back to the previously cooled oil, by cross-connecting the units. Since the specific heat of the oil increases with temperature, once the oil enters a unit its rate of flow cannot be adjusted to maintain a constant temperature difference relative to the water. However, it has been found that this problem can be corrected by forming each unit (both the oil and the water heating units) in series connected sections, and by diverting a certain amount of oil from a zone between sections of the oil heating unit to a zone between sections of the water heating unit. In this manner, partial compensation for the variable specific heat of the oil in the coil heating unit can be effected.

Other objects are to provide for maximum surface contact between the oil and the water, to prevent coalescing of the droplets of oil in the heat exchange portion of the heat exchange vessels, and to provide for ready control over the operation of the heat exchange units.

Still another object of the invention is that of insuring that the droplets of oil do coalesce after having performed their heat exchange function, so that the oil can be withdrawn as a homogeneous liquid.

A further object of the invention is to reduce to a minimum convection currents in the heat exchange liquids as they flow countercurrent through the heat exchange vessel.

The manner in which these and other objects of the invention may be accomplished will be apparent from the following detailed description of the invention.

Figure 1:
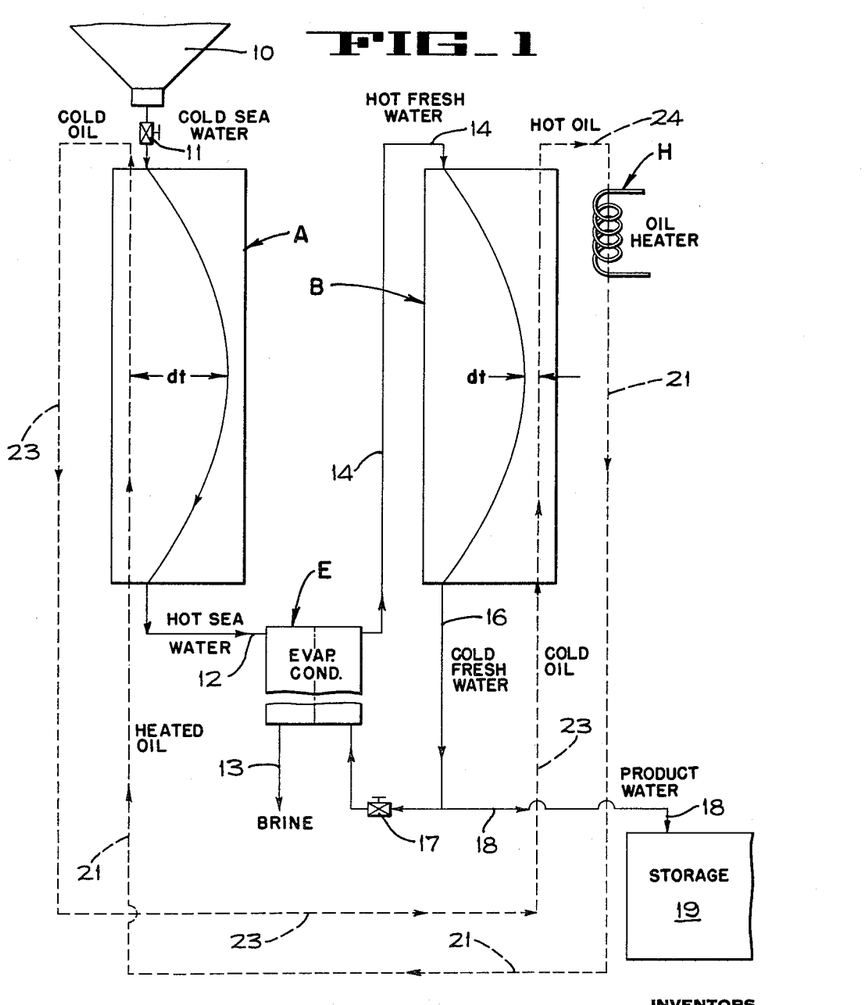
FIG. 1 is a schematic diagram of a sea water conversion system involving two heat exchange units connected to an evaporator-condenser unit.

Referring to the block diagram of FIG. 1, a sea water-conversion system is shown having a water heating heat exchange unit A, and an oil heating heat exchange unit B. Cold sea water comes from a tank 10 and is admitted to the unit A under control of a suitable valve 11. The cold sea water flows downwardly through the heat exchanger and picks up heat from the oil. The hot sea water leaves the heat exchange unit A by means of a line 12 and enters a combined evaporator and condenser unit E. Details of the evaporator and condenser unit are not part of the present invention, suitable units for this purpose being known in the art.

In the evaporator and condenser unit E, a portion of the hot sea water is evaporated and another portion is drawn off in the form of brine through line 13. The vapor derived from the water is condensed and is taken off in the form of hot fresh water by means of line 14, which hot fresh water enters the upper portion of the oil heating heat exchange unit B. The hot fresh water flows downwardly through the heat exchanger and the heat is transferred from the water to the oil in the exchanger, cold fresh water leaving the heat exchanger B by means of line 16. Under control of valve 17, a portion of the cold fresh water is admitted to the condenser portion of unit E for condensing the water vapor into fresh water. A portion of the cold fresh water leaving the oil heating heat exchange unit B is conducted by line 18 to a storage tank 19 to form the product fresh water.

In the oil circulating system, heated oil passes through line 21 and enters the lower portion of the water heating heat exchanger A. Here the oil flows upwardly through the heat exchanger and heat is transferred from the oil to the sea water. The cool oil leaves the heat exchanger A by means of line 23 and is transferred to the lower portion of the oil heating heat exchanger B. In this heat exchanger the oil again rises but here it is heated by the hot fresh water passing downwardly through the exchanger. The hot oil leaves the heat exchanger B by means of line 24, whereupon the oil passes through an oil heater H which makes up for heat losses due to conduction and radiation, as well as for the heat lost when the brine is withdrawn from the system through line 13, and the sensible heat of the product water.

The water heating heat exchange unit A and its associated equipment will now be described in detail. This description will also suffice for the oil heating unit B, which is similarly arranged. Referring to FIGS. 2–9 and particularly to FIG. 2, the heat exchange unit A and its associated equipment are shown in somewhat diagrammatic form. The heat exchanger comprises a column or vessel 26, and a water inlet and oil separating unit 27 is provided. This unit includes means for distributing the incoming water into the oil, comprising plate 28 disposed adjacent the upper portion of the vessel, which plate extends across the vessel. The plate 28 divides the upper portion of the vessel into an inlet chamber 28a for incoming water W, and a zone below the plate which is an outlet zone 28b for the coalesced oil O. Extending downwardly from plate 28 are water inlet tubes 29 the construction of which appears in FIG. 4. Each tube 29 is necked down at 31 and a sleeve 32 is welded in place over the necked down portion of the tube. The sleeve 31 has an extension 33 that clears the necked down tube portion 31. The bottom of the sleeve is closed by a plate 34 and water outlet slots 35 are formed in the extension 33 of the sleeve 32. This construction provides for controlled introduction of water into the heat exchange zone and prevents oil from finding its way into the water supply.

Figure 2:
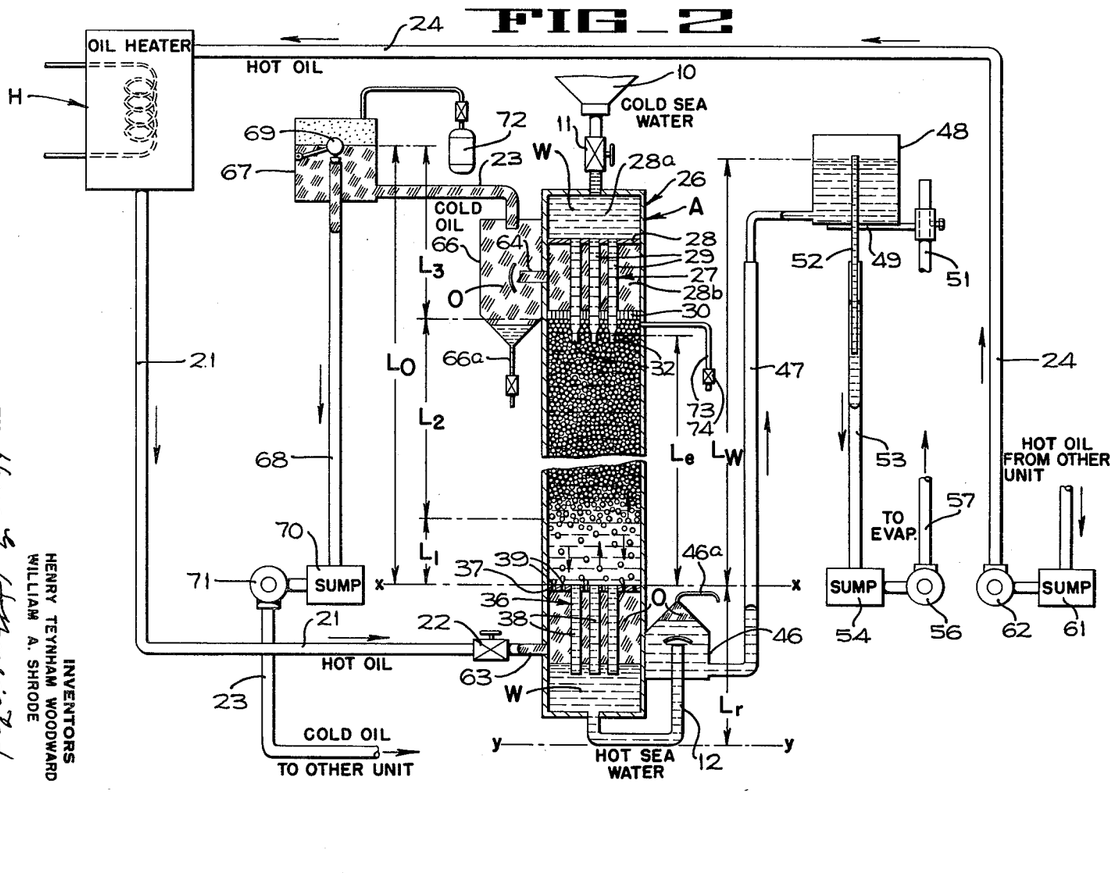
FIG. 2 is a diagram showing one of the heat exchange units and associated equipment.
Figure 3:
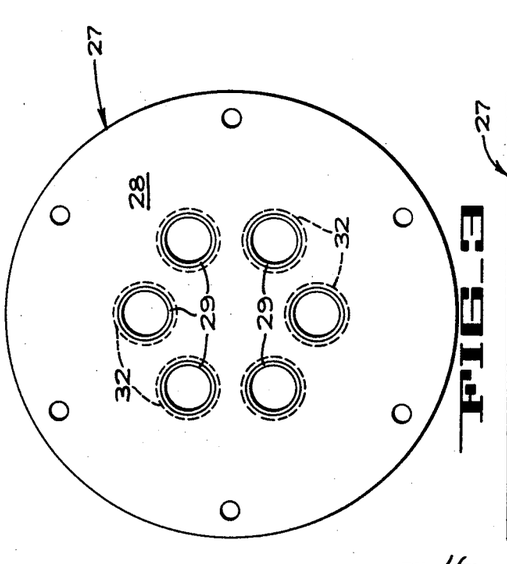
FIG. 3 is a plan of the water inlet tube assembly.
Figures 7, 8, 9:
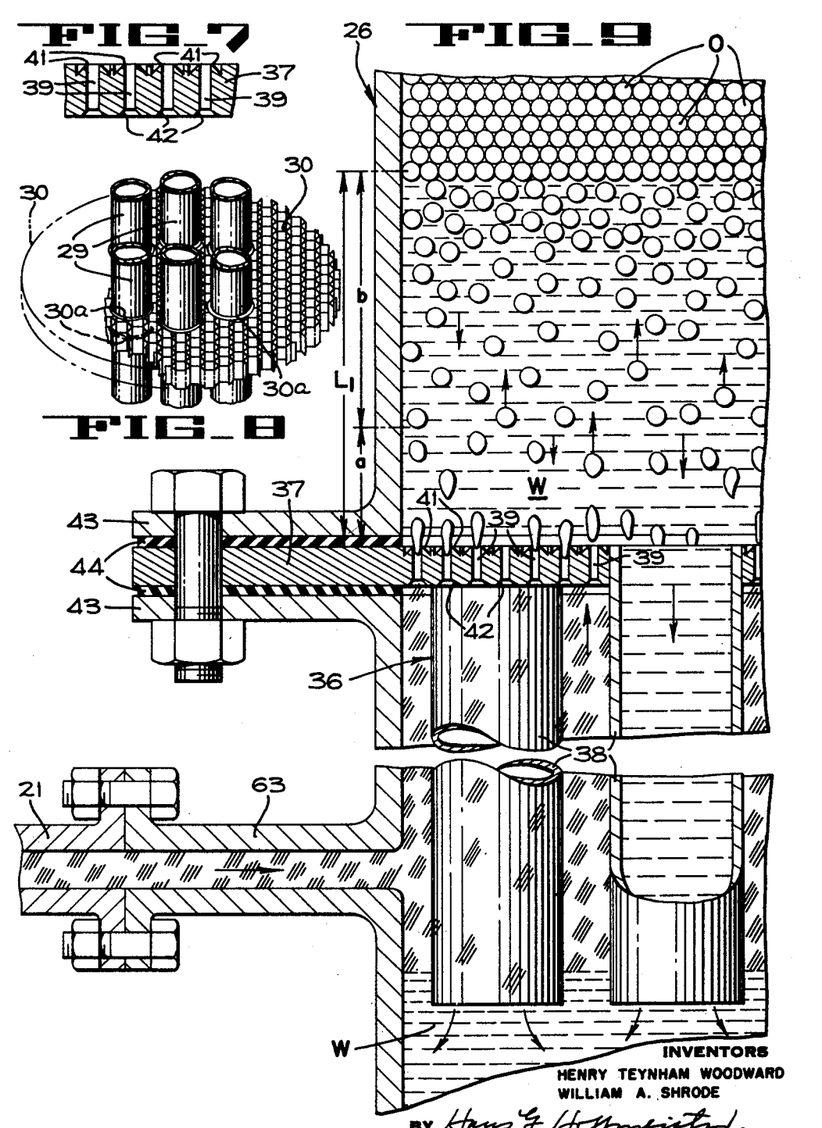
FIG. 7 is a section taken on 7—7 of FIG. 5.
FIG. 8 is a perspective of the coalescing honeycomb structure that coalesces the oil droplets into a body of oil.
FIG. 9 is an enlarged fregmentary section through a heat exchange unit showing the action of the droplets as they are formed and as they pack together.

As seen in FIG. 2, disposed across the vessel and mounted above the outlet slots of the water tubes 29, is a honeycomb member 30, also seen in perspective in FIG. 8. This member coalesces the oil droplets as they rise through it near the top of the column.

Figures 4, 6:
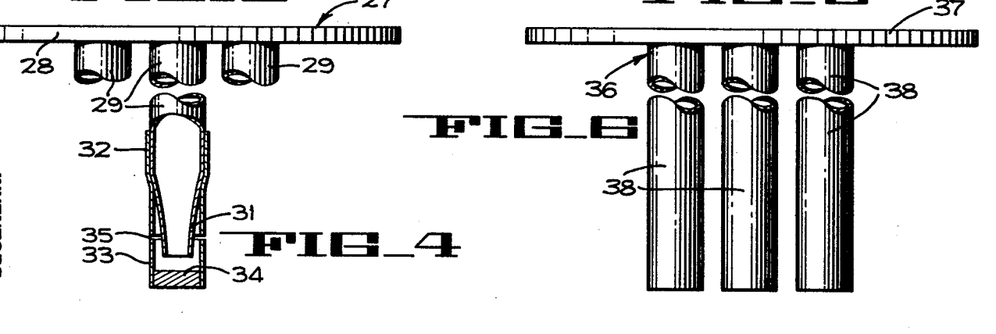
FIG. 4 is a section of the water inlet assembly.
FIG. 6 is a side elevation of the oil dispersing inlet plate and the water outlet tubes.
Figure 5:
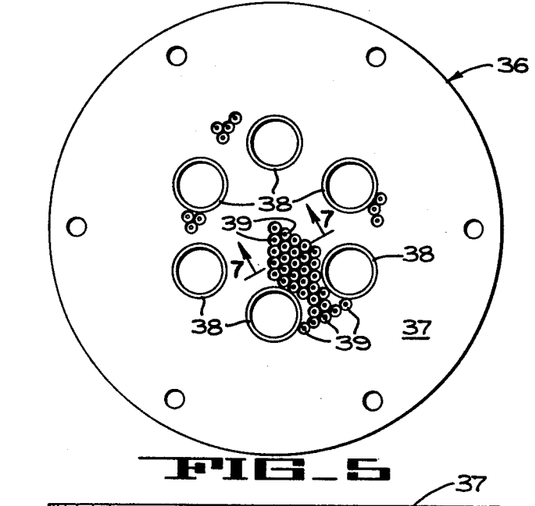
FIG. 5 is a plan of the oil dispersing inlet plate and water outlet tubes.

There is also a water and oil separation assembly 36 mounted at the lower end of the column. This assembly distributes the oil into the water and conducts water from the column. This is in the form of an orificed plate 37 that supports downwardly extending water conducting outlet tubes 38. Referring to FIGS. 5 to 7, the plate 37 is drilled to provide oil distributing orifices 39. The plate is recessed or countersunk around the outlet of the orifices 39 to form nozzle like projections 41 at each orifice. The inlets to the orifices 39 are chamfered at 42 to provide for smooth flow entry of oil into the orifices in the plate. As seen in FIG. 9, the plate and the tube assembly 36 is mounted between flanges 43 of upper and lower sections of the vessel and sealed by gaskets 44.

Some typical dimensions of the heat exchange units of a pilot installation including a pair of heat exchangers formed in accordance with this invention will be given. The vessel 26 is in the form of a 4″ diameter tube. The effective length of the tube, i.e., the length wherein heat transfer occurs is indicated at $L_e$ in FIG. 2. This length equals the distance between the oil distributing plate 37 and the water outlet slots 35 formed in water inlet tubes 29. In the installation described this distance is in the order of 9 feet. There are six water inlet tubes 29 having a ¾″ outer diameter and ⅝″ inner diameter, these tubes being 18 inches long although their length is not critical. There are six water outlet tubes 38 having substantially the same dimensions as mentioned. The droplet forming orifices 39 have a diameter of 1/16 of an inch, and with a 4 inch diameter plate about 200 such orifices will be provided. These orifices produce spherical droplets having a diameter that is slightly under ⅛ of an inch. The honeycomb member 30 provided to coalesce the oil droplets into a body of oil is shown in FIG. 8. It is made of very thin aluminum foil. The water inlet tubes 29 extend through the foil and the foil is held in place on the tubes by rubber O-rings 30a. The face-to-face dimension across the hexagons of the honeycomb unit is approximately ¼ of an inch. The water-oil separating plate 28 can also be mounted in the manner of plate 37 as shown in FIG. 9, such details being mere matters of design.

Referring again to FIG. 2, the other accessories connected with the heat exchange unit will be described. As the hot sea water W leaves the heat exchange unit A by means of outlet line 12, the water enters an oil and water separator 46. In this separator the oil O rises to the top and can be withdrawn through fluid line 46a by means forming no part of the invention. The quantity of oil entrained in the water has been found to be very small.

The hot sea water leaves the separator 46 by means of line 47 and enters a liquid level control tank 48. This tank is mounted on platform 49 that is adjustably carried on a vertical support 51 so that the height of the tank 48 and hence the height of the water level can be controlled. The outlet pipe 52 fixed to the tank makes sliding sealing engagement with a downcoming pipe 53 which leads to the sump 54. There is a similar sliding seal in line 47. The hot water is withdrawn from the sump 54 by means of a pump 56 which forces the water to the evaporator unit through a line 57. As mentioned, at the evaporator unit E the hot sea water is evaporated into water vapor which vapor is condensed into hot fresh water, as indicated in the diagram of FIG. 1.

Referring to the oil circuit through the heat exchanger unit A, oil that has been heated by the hot fresh water in the heat exchanger B, as indicated in diagram of FIG. 1, enters a sump 61 from which it is pumped by means of a pump 62 and discharged through line 24 to an oil heater tank H. Here the necessary make-up heat is added to the oil, and the oil flows down line 21 through the oil inlet control valve 22. The hot oil enters the vessel by an oil inlet 63 that is disposed below the droplet forming plate 37 and above the lower ends of the water outlet tubes 38. The incoming body of hot oil O rises through the orifices 39 formed in plate 37 and is formed into droplets. These rise in the tower, countercurrent to the downwardly flowing water, and near the top of the unit the droplets are coalesced by honeycomb member 30 into a body of cold oil. Cold oil is withdrawn from the vessel by means of an outlet port 64 which is disposed below the upper plate 28 and above the coalescing honeycomb member 30. The cold oil enters a separator 66 from which the very small amount of water entrained with the oil separates by gravity, the water being removed by a suitable outlet line 66a. Line 23 conducts the oil to a level control tank 67 and the oil flows out of the tank by a down coming line 68 under control of a float valve 69 that maintains the oil level in the tank 67 at a predetermined height. The cold oil enters the sump 70 and is circulated by means of a pump 71 through line 23 to the other heat exchange unit B wherein it is heated by the hot fresh water leaving the evaporator, as indicated in the diagram of FIG. 1. A source 72 of nitrogen gas is connected to tank 67 to exclude air and hence inhibit oxidation of the oil.

Any free scale that is formed tends to rise to the honeycomb coalescing plate 30. The slurry of scale and water can be withdrawn from this zone by a suitable small bleed line 73 controlled by valve 74.

The various static heads involved in the operation of the heat exchanger unit A will be described in connection with the diagram of FIG. 2. The entire oil and water system, including the vessel 26 can be best considered as being a U-tube manomteer, and an explanation of the heads involved and the flow characteristics of the apparatus will be explained on a manometer basis. A reference line $x$—$x$ can be established at the oil distributing plate 37. This reference line is drawn a distance $L_r$ above a reference line $y$—$y$ which represents the lowermost portion of the system. The water coming down through tubes 38 and the body of water at the bottom of the vessel, balance the column rising in line 12 and extending from the oil separator 46 up line 47 to the level $x$—$x$ of plate 37. Thus the static water heads in length $L_r$ can be ignored.

As to the effect of oil flow in the system; the oil entering the vessel through the valve 22 and inlet port 63 rises up through the orifices in plate 37 and into the effective heat transfer section of the vessel. Since the valve 22 is adjusted to admit oil at the same rate that it rises through the heat exchange vessel, the incoming flow of oil does not affect the static water balance of the portion of the system below the reference line $x$—$x$ and hence further discussion will be related to the condition existing above reference line $x$—$x$ passing through the oil distribution plate 37.

As to the effect of flow of the incoming sea water, the inlet valve 11 for the water is adjusted so that the water enters the upper portion of the vessel at the same rate that it flows down through tubes 29 and out orifices 35 into the effective volume of the column, thus, the incoming volume of water leaves the upper chamber 28a of the vessel at the rate that it enters the chamber, and the body of water in chamber 28a can be ignored in so far as static balance of the system is concerned.

The effective legs of the manometer will now be described, and as just explained only static heads are involved, the effect of flow being negligible. One leg of the hypothetical manometer forming part of the system can be considered as the leg $L_W$ which is the height of the water column from the plate 37 to the top of the body of water in the tank 48. Water is withdrawn from this tank 48 by overflow pipe 52 at the same rate that it enters the vessel 26 of the heat exchanger A through inlet valve 11. Thus although there is water flow in the water leg of the system, the sizes of the various lines are large enough to render the effect of friction negligible, so that such flow does not in itself alter the static balance of the manometer system. The oil leg can be divided into three lengths. First there is a length $L_1$ above the reference line $x$—$x$ wherein the droplets are forming but have not become closely packed. There is another length $L_2$ which occupies the majority of the column and which extends from the zone where the droplets first become closely packed to the coalescing plate 30. These lengths $L_1$ and $L_2$ represent the effective heat exchange volume of the unit. Finally, there is a length $L_3$ above the coalescing plate 30 to the top of the oil in the tank 67, which represents the height of a solid column of oil. The height $L_W$ of the water column is adjusted to take into consideration the differences in density of the various portions of the oil and water column of the heat exchange unit. The height $L_W$ is related to the height $L_0$ which is the combined heights of $L_1$, $L_2$, and $L_3$, and is determined by the following considerations. The length $L_1$ multiplied by the equivalent density of the combined oil and water droplets in the corresponding volume, added to the length $L_2$ multiplied by the equivalent density of the oil and water droplets in that volume, and added to the length $L_3$ multiplied by the density of oil, will equal the length $L_W$, the static water head, multiplied by the density of the water. Since oil is less dense than water, the length $L_0$ of the composite oil and water portions of the heat exchanger will be greater than the length $L_W$ which is the static water head. As mentioned, the water tank 48 can be adjusted so that the static head $L_W$ is sufficient to make the length $L_1$, where the droplets are being formed and are coming together in closely packed relation, as short as possible, thereby providing an effective length $L_e$ of the column that has an optimum value. The length $L_2$ which is the length wherein the droplets are closely packed may be referred to as the "hold up" length. Here the heat exchange characteristics have been found to approximate closely that which would be expected from closely packed spheres. Since the spheres of oil are closely packed they present a maximum heat exchange surface to the water. It is apparent that the column of closely packed droplets continuously moves up the heat exchanger, as droplets are coalesced from the top of the column and added to the bottom of the column, as just described.

The volume of both oil and water flow is determined by the adjustment of valves 22 and 11, whereas the hold up length $L_2$ can be determined by adjustment of the static head $L_W$. Alternatively, the static head $L_0$ could also be adjusted to accomplish the same purpose.

The formation of the oil droplets is indicated diagrammatically in FIG. 9. As the oil rises through the orifices 39 formed in plate 37, it enters the water as a series of elongated streams. These soon break into oil droplets, this occurring over a short distance indicated by length "$a$" in the figure. After the droplets are formed, they tend to come together and eventually become closely packed. This gathering of the droplets occurs over another short distance indicated at "b" in the figure. The distance $a$ and $b$ add to form the length $L_1$, previously referred to. As mentioned, the height of the bottom of the closely packed column of droplets can be controlled by adjusting the head of either of the two legs of the manometer formed by the heat exchange system. Although the lengths $a$ and $b$ are held to a minimum for maximum efficiency, it has been found that such lengths should be present to facilitate the formation of small droplets.

As an example of the adjustment of the lower level of closely packed drops, assume that water level control tank 48 is lowered. Momentarily, the flow of water from the vessel 26 increases, because the static head $L_0$ now overbalances the lowered water head $L_W$.

This increased flow of water from vessel 26 is accepted by the water sump 54 until the static level in water control tank 48 is re-established at the top of pipe 52. This momentary drop in the height of the water leg $L_W$ would momentarily lower the height of the composite leg $L_0$, thereby dropping the oil level in oil tank 67. Under these circumstances, no oil would be withdrawn from the oil tank 67 by the oil pump 71, rather oil circulated through the system by the pump 71 would be momentarily supplied from the oil sump 70.

The effect of the above described lowering of water level control tank 48 is one of causing a greater total quantity of oil to enter the vessel 26, which additional oil is supplied from oil sump 61 by pump 62. This action continues until the oil in the oil tank 67 is again brought up to its former level. Now the manometer columns $L_0$ and $L_W$ are again balanced, the difference being that there is proportionately more oil and less water in the composite column $L_0$ than before, and hence the level of the packed oil drops will be lower than before.

As seen in FIG. 2 a valve 22 is provided in the hot oil inlet line 21 to unit A for control of oil flow. A similar valve (not shown), is provided in the cold oil line 23 entering unit B. These valves are adjusted together to maintain a steady state oil flow in the system.

A suitable oil for purposes of the invention is a highly refined saturated hydrocarbon formed of a petroleum base. An oil that is found to be satisfactory for these purposes has a specific gravity of 0.850 at 20° C., a viscosity of 4.2 centistokes at 20° C., and a molecular weight of 195. The specific heat of such an oil increases with its temperature and the volumetric heat capacity $C'_0$ can be expressed by the equation $C'_0 = 0.369 + 0.00054t$, where $C'_0$ is in calories per mililiter per degrees centigrade, and $t$ is the oil temperature in degrees centigrade. Employing oil of the characteristics described, and sea water, the system will circulate approximately 2.4 times as much oil as water. In other words, a typical run will circulate 2.4 gallons of oil for each gallon of water.

It has been mentioned that the volumetric specific heat of the oil increases as the oil temperature increases. This variation of specific heat would require a variation in the ratio of oil to water flowing through the system if a constant temperature difference were to be maintained between the oil and the water. For example, at 28° C. oil temperature, and with the oil referred to, there should be 2.63 times as much oil as water flowing through the system, whereas at 100° C. this ratio should be 2.36, a substantially smaller ratio.

A convention has been adopted in the diagram of FIG. 1 to show the result of this variation in the specific heat of the oil with temperature. In a given heat exchange unit or section of a unit, the only thing that can be done to control the temperature difference between the oil and the water, indicated as "$dt$" in FIG. 1, is to adjust the flow rates of the water and of the oil. Theoretically, the system is most efficient when the temperature difference $dt$ between the two fluids is constant. Because of the characteristics of the oil mentioned, a constant temperature difference cannot be attained, the best that can be done is to adjust the flow quantities so that the temperature difference $dt$ between the fluids at the top of the column equals that at the bottom of the column. This is indicated diagrammatically in the diagram of FIG. 1 wherein within each of the heat exchangers A and B the temperature difference $dt$ between the two liquids is indicated by the spacing, one from the other, of the flow lines representing the liquids. In the heat exchange unit A, wherein water is being heated, the temperature difference $dt$ is adjusted so that it is the same at the top and the bottom of the column. Under these conditions, the temperature difference is at a maximum at an intermediate point in the column, as indicated in the flow diagram. Conversely, in the heat exchange unit B, wherein oil is being heated, the temperature difference $dt$ can be adjusted to be a minimum at an intermediate point in the column with which the maximum difference occurs at the top and bottom of the column. Thus, in both units an overall minimum average temperature difference is obtained by adjusting the flow rate of the liquids so that the temperature differences are the same at both the top and bottom of the column.

Figure 10:
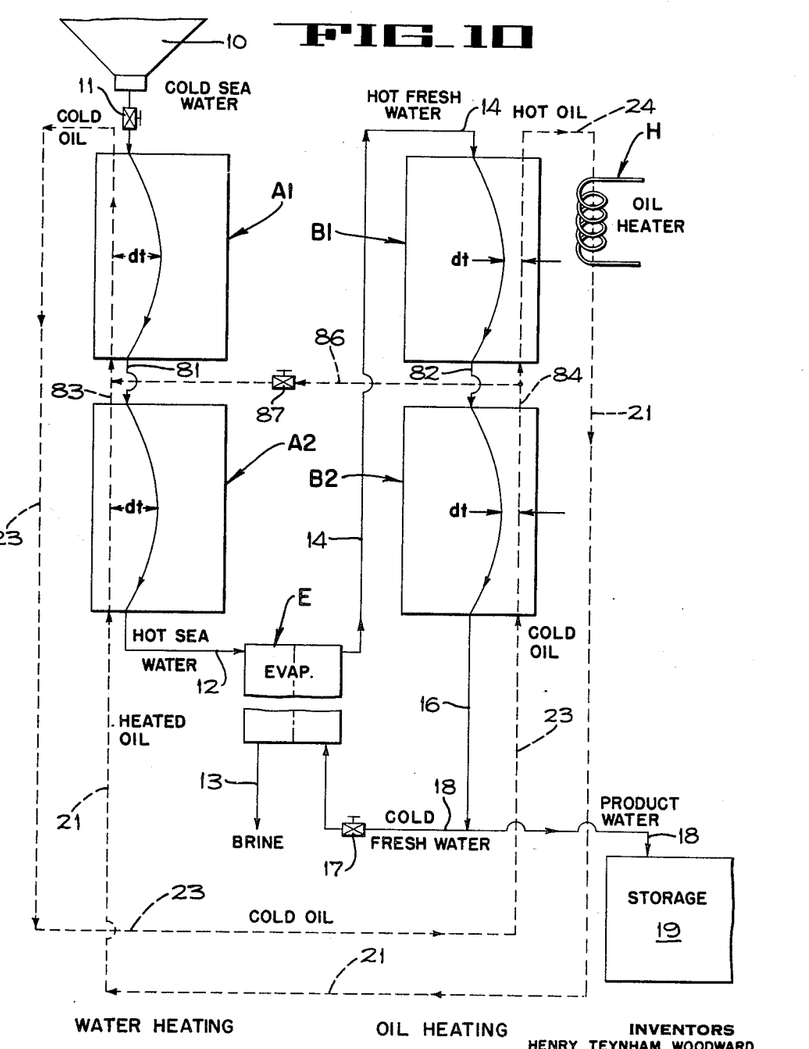
FIG. 10 is a schematic diagram of a sea water conversion system wherein the heat exchange units are each formed in two sections that are cross-connected to permit compensation for the changes that occur in the specific heat of the oil during the process.

To summarize, this mode of adjustment results in a temperature gradient or difference which is a minimum at the top and bottom of the column and a maximum at an intermediate portion of the column in heat exchange unit A, where the oil is being cooled. In heat exchanger unit B where oil is being heated, exactly the opposite situation exists, as indicated by the flow diagram in FIG. 1. These variations in the temperature difference $dt$ reduce the efficiency of the system and require the addition of more heat to the system than would be required if the temperature difference $dt$ could be made constant. This is not possible because once the liquids enter the column the flow conditions are fixed. However, the diagram in FIG. 10 shows means to partially compensate for this variation of the specific heat of the oil with temperature. Here the system is the same as before except the heat exchange unit A is divided into two sections A1 and A2, as is the heat exchanger unit B, which is divided into sections B1 and B2. Although only two sections of each unit are illustrated diagrammatically, the sectionalizing may be extended to provide any number of sections, the number of sections employed eventually being limited by the capital cost of the equipment involved.

As mentioned, and as seen in FIG. 10, the heat exchange units are formed in sections A1 and A2 and B1 and B2, respectively. There is a line 81 for conducting water from section A1 to section A2 and a line 83 for conducting oil from section A2 to section A1. Similarly, there is a line 82 for conducting water from section B1 to section B2 and a line 84 for conducting oil from section B2 to section B1. The oil is hot when it enters at the lower portion of section A2 and the oil is cooled as it rises through section A2 and through section A1. Thus in sections A2 and A1 the specific heat of the oil decreases as it rises through these sections. Conversely in sections B1 and B2, cool oil enters section B2 and the oil is heated as it rises through sections B2 and B1. In these sections the specific heat of the oil increases as the oil rises through the sections. We have found that the maximum temperature difference $dt$ occurring between the oil and water can be reduced by introducing a by-pass line 86 and a control valve 87 that connects from oil line 84 extending between the sections B2 and B1, to oil line 83 extending between sections A2 and A1. The valve 87 is adjusted so that a certain amount of oil is diverted or by-passed from the zone between sections B2 and B1 and introduced in the zone between sections A2 and A1.

To explain the effect of such by-passing and referring to sections B2 and B1, since the oil is cooler in section B2 than it is in section B1, the heat capacity of the oil in section B2 is lower than it is in section B1. Under these conditions, diversion of some of the partially heated oil as it flows from section B2 to enter section B1, reduces the amount of oil flowing in section B1 where the oil is further heated, and where its heat capacity becomes higher. Thus, there is more oil flowing in cooler section B2, where the heat capacity is lower, than there is in hotter section B1 where the heat capacity is higher. This diversion of oil keeps the difference in temperature between the oil and water more nearly constant.

Similarly, referring to sections A1 and A2, the oil in section A2 is only partially cooled and hence is hotter than the oil in section A1, which is eventually cooled to a temperature almost as low as that of the incoming cold sea water. Thus, the heat capacity of the oil in section A2 is greater than that of the cooler oil in section A1. Again, a balance can be approached by introducing the oil directed from the exit of section B2, which oil is partially heated, into the system so that the diverted oil enters section A1 directly, where the final cooling of the oil takes place. Thus, in each of the heat exchange units there is more oil flowing in a section where the oil is relatively cool (sections B2 and A1) than where it is relatively hot (sections B1 and A2), and by proper adjustment of valve 87 the temperature differences between the oil and water in each section can be made a minimum. With proper adjustment of valve 87, the maximum temperature difference $dt$ in each section can be brought to approximately half the variation that occurs when only a single section is employed for each unit. Thus, the cross bleeding or diversion of oil in the proper direction provides a partial volumetric control and partially compensates for the increase in the specific heat of the oil as its temperature increases.

The importance of compensation for variations in the heat capacity of the oil with temperature can be readily understood, for example, by reference to the oil heating section B of FIG. 1. As has been mentioned, and as is known in the heat exchange art, the smaller the temperature differential $dt$ at the top and bottom of the column, the more efficient is the system. Consideration will also show that optimum efficiency is had when the temperature differentials at the top and at the bottom of the column are equal. Since the differential $dt$ is a minimum near the midportion of the column in section B, the differentials at the top and bottom of the column must be large enough to prevent the differential from becoming zero or from closely approaching zero. If the temperature differential $dt$ at the midportion of the column becomes zero the effectiveness of the column as a heat transfer agency ceases. If the differential at the midportion becomes unduly small, the inlet and exit temperature differentials must be increased to compensate for the reduction of heat transfer at the midportion. Thus the overall efficiency of the unit is substantially reduced. With a variable temperature gradient, the temperature differential at the midportion of the column dictates the minimum differential that can be provided at the top and bottom of the column. Comparison of FIG. 1 with FIG. 10 shows how the compensation action present in the system of FIG. 10 reduces the spread in temperatures between the two liquids and so permits running the system with a smaller temperature differential at the top and bottom of the columns in sections B1 and B2.

In the water heating units A1 and A2 of FIG. 10, this compensation provides a reduction in the maximum temperature differential that occurs at the midportion of the column. Although the effect of such reduction is to decrease the efficiency of the unit slightly, it has been found that the gain in efficiency of the oil heating unit produced by such compensation more than offsets the resulting slight decrease in the efficiency of the water heating unit.

Figure 11:
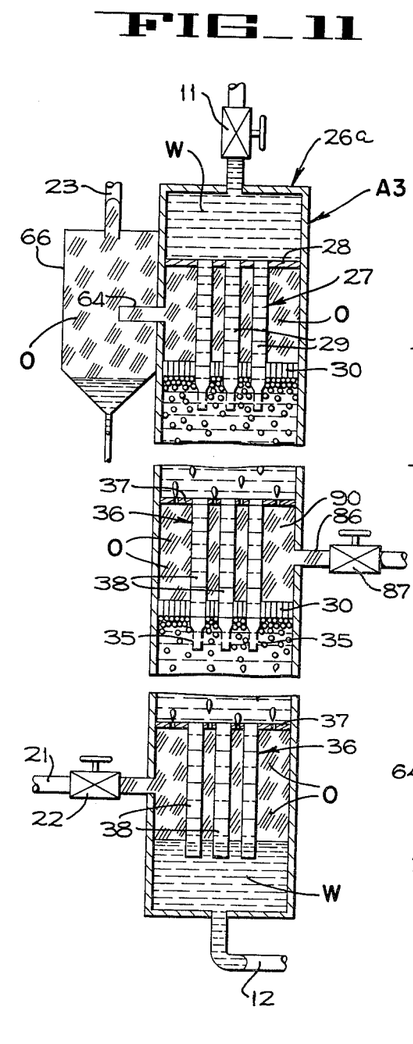
FIG. 11 is a section of a modified form of sectionalized heat exchange unit.

Instead of connecting two separate and complete units in series as indicated in FIG. 1, the units may be combined in a single vessel while retaining the characteristics of series connected units, as shown in FIG. 11. A water heating unit A3 is shown in this figure. In this unit, the water distributing unit 27, the honeycomb plate 30 at the top of vessel 26a, and the water and oil separating unit 36 including the orifice plate 37 near the bottom of the vessel, are of the same construction as the corresponding units shown in FIGS. 2–9. In order to sectionalize the unit an additional water and oil separating unit 36, including the orifice plate 37, is mounted adjacent the mid-plane of the column. A honeycomb oil coalescing plate 30 is mounted about tubes 38 above the water distributing orifices 35. This forms an intermediate chamber 90 filled with coalesced oil, and the transfer line 86 for specific heat compensation connects to chamber 90. As mentioned, the water heating unit is shown in FIG. 11. The oil heating unit (not shown) is of the same construction except that line 86 conducts compensating oil away from an intermediate chamber formed by including an additional water and oil separating unit 36 adjacent the mid-plane of the unit.

Figure 12:
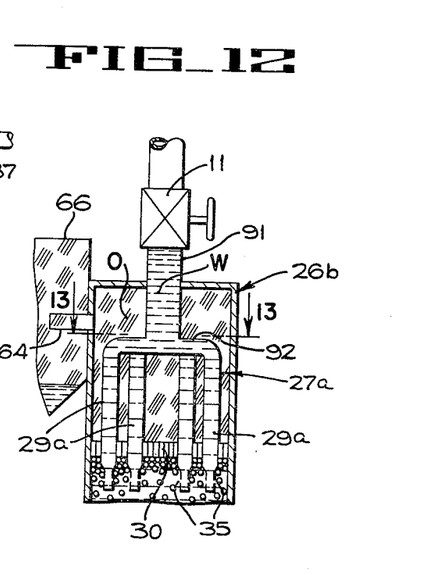
FIG. 12 is a fragmentary section showing a modified form of water distributing unit.
Figure 13:
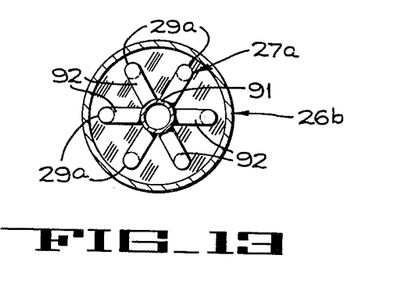
FIG. 13 is a section taken on 13—13 of FIG. 12.

FIGS. 12 and 13 show a modified form of water inlet header 27a. Here the vessel 26b is provided with a water inlet pipe 91 from which a plurality of branches 92 radiate. Water inlet tubes 29a, constructed like previously described water inlet tubes 29, depend from branches 92. The mode of operation of this form of the invention is like that of the other forms, the only difference being that no upper wall is required to separate the water and the oil.

The diagrams of FIGS. 1 and 2 show single section water and oil heating units connected to the evaporator. In a commercial installation these units would be made up of two or more series connected sections because it is more efficient to operate over a given total temperature rise with multi-section units than with single section units. An example of typical temperature conditions in a pair of single section units is as follows:

The incoming sea water will be raised from 70° F. to 205° F. in the water heating unit A. This temperature increase of 135° F. would be adequate for distillation in an evaporator operating at sub-atmospheric pressure, as in the diagram of FIG. 1, or if a higher exit water temperature is desired, one or more additional sections could be added. In the water heating unit, the inlet and exit temperatures of the oil will be 1.6° F. higher than the exit and inlet temperatures of the water, respectively. The temperature difference $dt$ at the mid-point of the column will be 3.8° F., and the mean temperature difference between the two liquids in the column will be 3° F.

In the oil heating unit B, the inlet and exit temperature differences of each liquid will be substantially the same as in the other unit, namely 135° F. The inlet and exit temperatures of the oil will be 4.8° F. lower than the exit and inlet temperatures of the water, respectively. The temperature difference $dt$ at the mid-point of the column will be 2.6° F., and the mean temperature difference between the two liquids in the column will also be 3° F. The above temperature figures are given by way of example only, it being understood that heat exchangers of the present invention can be designed, adjusted, and operated to provide heat exchange processes that encompass a wide range of selection of temperature parameters.

The dimensions and examples given in the description of the invention just completed are those suitable for a relatively small installation. The size of the heat exchangers would be much greater in a full size system for saline water conversion, and it will be recognized that the heat exchangers of the invention can be used individually or in pairs in other heat exchange systems or applications.

It has been found that the effect of counter-currents in the heat exchange liquids is reduced to a minimum in the present invention. Since the oil droplets are closely packed they will have little or no tendency to circulate, nor will the water circulate appreciably in the zone of closely packed droplets, which zone occupies the majority of the vessel.

The oil described has been found to have the proper viscosity and flow characteristics to provide discrete closely packed droplets. However, it will be understood that the nature of the oil or its equivalent will be determined by the temperature ranges involved. The oil described has characteristics that make it function satisfactorily at temperatures well above that of boiling water.

In the appended claims, where the term "water" appears, it is intended that such term includes sea water and other aqueous solutions.

The invention having thus been described, what is believed to be new and desired to be protected by Letters Patent is:

1. Apparatus for directly transferring heat between immiscible liquids of different densities comprising a vertical heat exchange vessel of substantially uniform cross-sectional area, an upper liquid inlet tube extending downwardly into said vessel and being formed with a restricted liquid outlet opening, a lower liquid separating wall extending across a lower portion of said vessel, a lower liquid outlet tube extending downwardly from said lower wall and having a liquid outlet opening formed therein disposed above the bottom of said vessel, a plurality of orifices formed in said lower wall, means for admitting the denser of said liquids to said upper inlet tube, means for withdrawing the denser of said liquids from said vessel at a zone below the outlet opening in said lower tube, means for admitting the less dense liquid to said vessel at a zone between said lower wall and the outlet opening in said lower tube, means for withdrawing the less dense liquid from said vessel at a zone above the restricted outlet opening in said upper inlet tube, the orifices in said lower wall breaking the less dense liquid into discrete droplets as the liquid passes upwardly through said orifices, the discrete droplets moving into contact as they rise through the denser liquid, means for establishing a predetermined head on each of the liquids leaving the vessel, and means for adjusting the relative value of said heads for establishing a zone where the discrete droplets of less dense liquid become closely packed in the vessel as they rise in said vessel.

2. Apparatus for directly transferring heat between immiscible liquids of different densities comprising a vertical heat exchange vessel, a perforated coalescing member for the less dense liquid extending across an upper portion of said vessel, an inlet tube for the denser liquid extending downwardly through said coalescing member, less dense liquid dispersing wall means having a plurality of orifices therein and extending laterally in a lower portion of said vessel, liquid outlet means for the denser liquid leading downwardly from said liquid dispersing wall, means for continuously admitting the denser of said liquids to said denser liquid inlet tube, means for continuously withdrawing the denser of said liquids from said denser liquid outlet means, means for admitting the less dense liquid to said vessel for dispersal through said dispersing wall means, means for withdrawing the less dense liquid from said vessel at a zone above said coalescing member, the orifices in said liquid dispersing wall means breaking the less dense liquid into discrete droplets as the less dense liquid passes upwardly through said orifices, the discrete droplets moving into contact as they rise through the denser liquid, said perforated member coalescing the droplets of said less dense liquid for withdrawal, and means establishing a predetermined head on each liquid of the composite column of liquids in said vessel, the head on the denser liquid equaling the sum of the head of the less dense liquid above said coalescing member, the combined heads of a composite column of closely packed discrete droplets of the less dense liquid and the head of the denser liquid which column occupies a major portion of the vessel beneath said coalescing member, and the combined heads of a composite column of individually rising droplets and the head of the denser liquid which column occupies a minor portion of the vessel above said dispersing wall means.

3. Apparatus for directly transferring heat between immiscible liquids of different densities comprising a vertical heat exchange vessel, inlet tube means for the denser liquid extending downwardly into the upper portion of said vessel, less dense liquid dispersing wall means having a plurality of orifices therein and extending laterally in a lower portion of said vessel, liquid outlet means for the denser liquid leading downwardly from said liquid dispersing wall, means for continuously admitting the denser of said liquids to said denser liquid inlet tube means, means for continuously withdrawing liquid from said denser liquid outlet means, means for admitting the less dense liquid to said vessel for dispersal through said dispersing wall means, means for withdrawing the less dense liquid from said vessel at a zone above the outlet of said denser liquid inlet tube means, the orifices in said liquid dispersing wall means breaking the less dense liquid into discrete droplets as the less dense liquid passes upwardly through said orifices, the discrete droplets moving into contact as they rise through the denser liquid, said droplets coalescing into a homogeneous body above the outlet of said denser liquid inlet tube means, and means establishing a predetermined head on both liquids of the composite column of liquids in said vessel, said head on the denser liquid equaling the sum of the head of the coalesced less dense liquid, the combined heads of a composite column of closely packed discrete droplets of the less dense liquid and the head of the denser liquid which column occupies a major portion of the vessel, and the combined heads of a composite column of individually rising droplets of the less dense liquid and the head of the denser liquid which column occupies a minor portion of the vessel above said dispersing wall means.

4. The apparatus of claim 3, wherein said vessel is of substantially uniform cross-sectional area, and wherein said less dense liquid dispersing wall means extends entirely across the vessel with said liquid outlet means for the denser liquid extending directly downwardly from said dispersing wall means.

5. The apparatus of claim 3, wherein said inlet tube means for the denser liquid comprises a plurality of tubes, each of which has a restricted liquid outlet.

6. The apparatus of claim 3, wherein said liquid dispersing wall means is recessed around the outlet ends of the orifices therein to provide miniature nozzle-like projections for assisting in the formation of droplets of the less dense liquid.

7. Apparatus for exchanging heat between two immiscible liquids of different densities, the less dense liquid having a specific heat that increases as its temperature increases, the denser liquid having a specific heat that remains relatively constant as its temperature increases, said apparatus comprising a heating unit for each liquid, each heating unit being formed as series-connected upper and lower sections, means for admitting a relatively cool stream of the denser liquid to the upper portion of the upper section of its heating unit and means for admitting a heated stream of the denser liquid to the upper portion of the upper section of the heating unit for the less dense liquid, means for causing the denser liquid to flow downwardly through both heating units, means for withdrawing the denser liquid from the lower sections of both heating units, means for admitting a heated stream of the less dense liquid to the lower portion of the lower section of the heating unit for the denser liquid and means for admitting a cooled stream of the less dense liquid to the lower portion of the lower section of the heating unit for the less dense liquid, means for causing the less dense liquid to rise through both sections of both heating units, means for withdrawing the less dense liquid from the upper sections of both heating units, means for returning the cooled less dense liquid withdrawn from the upper section of the heating unit for the denser liquid to the lower section of the heating unit for the less dense liquid, means for returning the heated less dense liquid withdrawn from the upper section of its heating unit to the lower section of the heating unit for the denser liquid, and means for conducting a portion of the partially heated less dense liquid leaving said lower section of its heating unit to the partially cooled less dense liquid entering the upper section of the heating unit for the denser liquid, for minimizing the spread in temperature differences between the liquids in the heating unit for the less dense liquid.

8. The apparatus of claim 7, wherein said less dense liquid is a hydrocarbon oil and the denser liquid is water.

9. The apparatus of claim 7, wherein means are provided for externally heating one of said liquids to make up for heat losses.

10. The apparatus of claim 8, wherein means are provided for externally heating the oil.

11. Apparatus for directly transferring heat between water and an oil that is less dense than water and has a specific heat that increases as its temperature increases, said apparatus comprising a heat exchange vessel, a water inlet tube extending downwardly into an upper portion of said vessel, a lower liquid separating wall extending laterally in a lower portion of said vessel, water outlet means leading downwardly from said lower wall, a plurality of orifices formed in said lower wall, means for admitting the water to said water inlet tube, means for withdrawing the water from said water outlet means, means for admitting the oil to said lower wall, means for withdrawing the oil from said vessel at a zone above the outlet opening in said water inlet tube, the orifices in said wall breaking the oil into discrete droplets as the oil passes upwardly through said orifices, the droplets of oil moving into contact as they rise through the water, a perforated oil coalescing member extending across said vessel at a zone between said means for withdrawing the oil and the inlet opening in said water inlet tube, an intermediate wall extending across a mid-portion of said vessel, oil droplet forming orifices in said intermediate wall, a water conducting tube extending downwardly from said intermediate wall, an intermediate perforated oil coalescing member extending across said vessel at a zone between said intermediate wall and the outlet of said water conducting tube, an oil port in said vessel between said intermediate wall and said intermediate perforated oil coalescing member, means for establishing a predetermined head on each of the liquids leaving the vessel, and means for adjusting the relative value of said heads for establishing zones where the discrete droplets of oil become closely packed in the vessel as they rise toward said oil coalescing members.

12. Apparatus for directly transferring heat between the continuous and dispersed phases of immiscible liquids of different densities; said apparatus comprising a heat exchange vessel, a liquid inlet tube for the continuous phase liquid projecting into said vessel adjacent one end thereof, combined liquid separating and dispersing plate means for the dispersed phase liquid adjacent the other end of said vessel and having a plurality of dispersing orifices formed therein, liquid outlet means for the continuous phase liquid extending from said dispersing plate means, means for continuously admitting the continuous phase liquid to said continuous phase liquid inlet tube, means for continuously withdrawing the continuous phase liquid from said liquid outlet means, means for continuously admitting the liquid that forms the dispersed phase liquid to said dispersing plate means, the orifices in said plate means breaking the dispersed phase liquid into streamlets which form discrete droplets as the dispersed phase liquid flows through said vessel, said droplets coalescing into a homogenous body of liquid adjacent the outlet of said continuous phase liquid inlet tube, means for continuously withdrawing said coalesced dispersed phase liquid, and means establishing a predetermined head of the continuous phase liquid on the composite column of liquids in said vessel, said head equaling the sum of the head of the coalesced dispersed phase liquid, the combined heads of a composite column of closely packed discrete droplets of the dispersed phase liquid and the head of the continuous phase liquid which column occupies a major portion of the vessel, and the combined heads of a composite column of individually moving droplets of the dispersed phase liquid and the head of the continuous phase liquid which column occupies a minor portion of the vessel adjacent said dispersing plate means.

13. The apparatus of claim 12, wherein said vessel is of substantially uniform cross-sectional area along its length.

14. The apparatus of claim 12, wherein said dispersed phase liquid is a hydrocarbon oil and said continuous phase liquid is water.

15. A water-oil heat exchange process comprising the steps of causing initially cold water to move unidirectionally downward through a first set of serially connected columns, causing initially hot water to move unidirectionally downward through a second set of serially connected columns, introducing hot oil to the lower portion of the lower of said first set of columns, restricting the flow of the hot oil so introduced so as to disperse the hot oil into discrete droplets, introducing cold oil to the lower portion of the lower of said second set of columns, restricting the flow of the cold oil so introduced to disperse the cold oil into discrete droplets; adjusting the relative heads on the two liquids in both sets of columns for causing said droplets of oil to rise in each of said columns and come together in the form of rising columns of closely packed discrete droplets, and causing said packed droplets of oil to move above the composite columns of water and oil droplets at the upper portions of each of said columns, thereby coalescing said oil droplets into a body of water-free oil; withdrawing the coalesced oil from the upper column of each set of columns and withdrawing the water from the lower column of each set of columns, diverting partially heated cold oil from a zone between columns of said second set of columns and adding the diverted oil to the partially cooled hot oil at a zone between columns of said first set of columns, and adjusting the amount of diverted oil to minimize the spread in the oil-water temperature differences throughout the length of the columns of said second set of columns.

16. A process for effecting heat exchange between two immiscible liquids of different densities and at different temperature levels, which comprises the steps of introducing one of the liquids into one end of a vessel in a relatively unrestricted manner for establishing a unidirectional vertically moving column of said one liquid through the vessel as a continuous phase liquid, introducing the other liquid into the other end of said vessel, restricting the flow of said other liquid in the vessel to break the liquid into discrete droplets, introducing said droplets into said column of continuous phase liquid as a dispersed phase liquid in the form of discrete droplets; establishing a head on both liquids in the composite column with the head on the continuous phase liquid in the column equaling the sum of the head of a coalesced body of dispersed phase liquid, the combined heads of a composite column of closely packed discrete droplets of the dispersed phase liquid and the head of the continuous phase liquid, and the combined heads of a composite column of individually moving droplets of the dispersed phase liquid and the head of the continuous phase liquid; for causing said droplets to move along the vessel counter to the motion of the column of continuous phase liquid along the vessel and come together in the form of a moving column of closely packed discrete droplets, causing the leading end of said column of packed droplets to move past the continuous phase liquid in the column of packed droplets thereby coalescing said droplets of dispersed phase liquid into a homogenous body, and withdrawing said coalesced dispersed phase liquid at the same rate as which the droplets of the dispersed liquid are introduced into the column of the continuous phase liquid.

17. The process of claim 16, wherein the dispersed phase liquid is a hydrocarbon oil and the continuous phase liquid is water.

18. A process for effecting heat exchange between two immiscible liquids of different densities and at different temperature levels which comprises the steps of establishing a unidirectional vertically moving column of one of the liquids as a continuous phase liquid, introducing the other liquid to said column to form a composite column, restricting the introduction of said other liquid to the composite column for causing said other liquid to break up in the form of discrete droplets thereby causing said other liquid in the column to be a dispersed phase liquid, establishing a head on the dispersed phase liquid causing the droplets of said dispersed phase liquid to move substantially unidirectionally and counter to the column of said continuous phase liquid and to come together as a continuous motion of the closely packed column of discrete droplets, coalescing the droplets of the dispersed phase liquid at the leading end of said packed column into a homogenous body of said dispersed phase liquid by moving the dispersed phase liquid past said composite column, withdrawing said coalesced dispersed phase liquid at the rate at which the dispersed phase liquid is introduced to the column, establishing a head on the continuous phase liquid in the column, withdrawing said continuous phase liquid from the column at the rate at which it is introduced thereto, maintaining said liquids separate at the zones wherein said continuous phase liquid enters and leaves the column of said dispersed phase liquid, and adjusting the relative value of said heads for maintaining the majority of the dispersed phase liquid in the column in the form of a closely packed, moving column of droplets.

19. The process of exchanging heat between an initially cold liquid and a heat transfer liquid, said transfer liquid having a specific heat that increases as its temperature increases and the other liquid having a specific heat that remains substantially constant within the temperature range of the process, comprising the steps of establishing a first vertical flow, countercurrent heat exchange path by introducing the initially colder liquid to the upper end of said first path and introducing heated transfer liquid to the lower end of said first path, comingling said liquids as they flow countercurrent and unidirectionally along said first path for heating and initially colder liquid by the heated transfer liquid while cooling the heated transfer liquid by the initially colder liquid along the length of said first heat exchanger path, until the relative temperatures of the liquids leaving said first path are interchanged from the relative temperatures of the liquids entering said first path; establishing a second vertical flow, countercurrent heat exchange path by withdrawing from said first heat exchange path liquid that was heated in the path, and introducing it as hot liquid into the upper end of said second path, withdrawing from said first path transfer liquid that was cooled in the first heat exchange path and introducing it as cold transfer liquid into the lower end of said second heat exchange path, comingling said liquids as they flow countercurrent and unidirectionally along the length of said second path for heating the transfer liquid and cooling the other liquid until the relative temperatures of the liquids leaving the second path are restored to their initial relative condition as they entered the first path; reducing the spread in the temperature differences between the liquids in said second heat exchange path wherein said transfer having a variable specific heat is the liquid that is being heated in the second path, by continuously diverting a partially heated portion of said transfer liquid from an intermediate zone in said second exchange path, and adding said diverted, partially heated transfer liquid to the partially cooled transfer liquid in an intermediate zone of said first heat exchange path.

References Cited by the Examiner
UNITED STATES PATENTS

| | | | |
|---|---|---|---|
| 1,151,801 | 8/15 | Kubierschky | 196—14.52 X |
| 2,364,892 | 12/44 | Elgin | 23—270.5 X |
| 2,467,951 | 4/49 | Whitley | 202—181 X |
| 2,721,790 | 10/55 | Olney | 23—270.5 |
| 3,047,479 | 7/62 | Young et al. | 165—2 |

FOREIGN PATENTS

| | | |
|---|---|---|
| 479,954 | 3/25 | Germany. |
| 690,039 | 4/53 | Great Britain. |

CHARLES SUKALO, *Primary Examiner.*
HERBERT L. MARTIN, JOHN J. CAMBY, PERCY L. PATRICK, *Examiners.*